US007908217B2

(12) United States Patent
Athens et al.

(10) Patent No.: US 7,908,217 B2
(45) Date of Patent: *Mar. 15, 2011

(54) METHOD AND SYSTEM FOR OPTIMIZING THROUGHPUT OF MAILING MACHINES

(75) Inventors: G. Thomas Athens, Derby, CT (US); Roger Ratzenberger, Jr., Milford, CT (US); Maria P. Parkos, Southbury, CT (US); Mark A. Scribe, Southbury, CT (US); Robert A. Cordery, Danbury, CT (US); John A. Hurd, Lake Mary, FL (US)

(73) Assignee: Pitney Bowes Inc., Stamford, CT (US)

( * ) Notice: Subject to any disclaimer, the term of this patent is extended or adjusted under 35 U.S.C. 154(b) by 848 days.

This patent is subject to a terminal disclaimer.

(21) Appl. No.: 11/837,750

(22) Filed: Aug. 13, 2007

(65) Prior Publication Data

US 2007/0276762 A1 Nov. 29, 2007

Related U.S. Application Data

(63) Continuation of application No. 10/246,040, filed on Sep. 17, 2002, now Pat. No. 7,272,581.

(60) Provisional application No. 60/363,790, filed on Mar. 12, 2002.

(51) Int. Cl.

| | |
|---|---|
| ***G06Q 99/00*** | (2006.01) |
| ***H04K 1/00*** | (2006.01) |
| ***H04L 9/00*** | (2006.01) |
| ***G06F 17/00*** | (2006.01) |
| ***G06K 9/00*** | (2006.01) |

(52) U.S. Cl. ............ 705/50; 705/60; 705/401; 705/408; 705/410; 382/101

(58) Field of Classification Search .................... 705/75, 705/50, 60, 401, 408, 410; 382/101
See application file for complete search history.

(56) References Cited

U.S. PATENT DOCUMENTS

| | | | | |
|---|---|---|---|---|
| 5,448,641 | A | 9/1995 | Pintsov et al. | |
| 5,586,036 | A * | 12/1996 | Pintsov | 705/408 |
| 5,625,694 | A | 4/1997 | Lee et al. | |

(Continued)

OTHER PUBLICATIONS

Information-Based Indici Program (IBIP)—Performance criteria for information-Based indicia and Security Architecture for Closed IBI Postage Metering Systems—USPS- Jan. 12, 1999.*

(Continued)

*Primary Examiner* — Charles C Agwumezie
(74) *Attorney, Agent, or Firm* — Brian A. Lemm; Charles R. Malandra, Jr.

(57) ABSTRACT

A mailing machine that optimizes throughput by reducing the amount of time necessary for the PSD to generate the digital signature and indicium for each mail piece is provided. The debit operation performed by the PSD, i.e., adjusting the PSD registers, is separated into three different sections, a pre-debit operation, a perform debit operation, and a complete debit operation. In addition, the calculation of the digital signature can optionally be pre-computed, or, alternatively, computed in stages, i.e., partial signature calculation. Utilizing this granularity, the cryptographic operations associated with generating the digital signature can be shifted between the three debit operations such that the execution time of the time critical portion of the debit operation (perform debit) can be optimized to meet the performance requirements of the mailing machine in which the PSD is deployed.

17 Claims, 5 Drawing Sheets

U.S. PATENT DOCUMENTS

| | | | | |
|---|---|---|---|---|
| 6,005,945 | A | 12/1999 | Whitehouse | |
| 6,081,795 | A * | 6/2000 | Ryan, Jr. | 705/408 |
| 6,125,357 | A | 9/2000 | Pintsov | |
| 6,175,826 | B1 | 1/2001 | Malandra, Jr. et al. | |
| 6,175,827 | B1 | 1/2001 | Cordery et al. | |
| 6,527,178 | B1 * | 3/2003 | Gordon et al. | 235/385 |
| 6,853,986 | B1 | 2/2005 | Rosenau et al. | |
| 6,982,808 | B1 * | 1/2006 | Ogg et al. | 358/1.18 |
| 2002/0087493 | A1 | 7/2002 | Herbert | |
| 2002/0190117 | A1 | 12/2002 | Manduley | |
| 2003/0078893 | A1 | 4/2003 | Shah et al. | |
| 2003/0118191 | A1 | 6/2003 | Wang et al. | |
| 2004/0030662 | A1 | 2/2004 | Gordon et al. | |
| 2007/0136216 | A1 | 6/2007 | Simcik et al. | |
| 2007/0239620 | A1 | 10/2007 | Schwartz et al. | |

OTHER PUBLICATIONS

Information-Based Indicia Program (IBIP)—Performance Criteria for Information-Based Indicia and Security Architecture for Closed IBI Postage Metering Systems—USPS—Jan. 12, 1999.

* cited by examiner

METHOD AND SYSTEM FOR OPTIMIZING THROUGHPUT OF MAILING MACHINES

CROSS-REFERENCE TO RELATED APPLICATIONS

This application is a continuation application of prior application Ser. No. 10/246,040, filed Sep. 17, 2002, now U.S. Pat. No. 7,272,581, which claims the benefit of U.S. Provisional Application Ser. No. 60/363,790, filed on Mar. 12, 2002, the specifications of which are hereby incorporated by reference.

FIELD OF THE INVENTION

The invention disclosed herein relates generally to mailing machines, and more particularly to a method and system for optimizing the throughput of a mailing machine.

BACKGROUND OF THE INVENTION

Mailing machines for printing postage indicia on envelopes and other forms of mail pieces have long been well known and have enjoyed considerable commercial success. There are many different types of mailing machines, ranging from relatively small units that handle only one mail piece at a time, to large, multi-functional units that can process hundreds of mail pieces per hour in a continuous stream operation. The larger mailing machines often include different modules that automate the processes of producing mail pieces, each of which performs a different task on the mail piece. The mail piece is conveyed downstream utilizing a transport mechanism, such as rollers or a belt, to each of the modules. Such modules could include, for example, a singulating module, i.e., separating a stack of mail pieces such that the mail pieces are conveyed one at a time along the transport path, a moistening/sealing module, i.e., wetting and closing the glued flap of an envelope, a weighing module, and a metering module, i.e., applying evidence of postage to the mail piece. The exact configuration of the mailing machine is, of course, particular to the needs of the user.

Typically, a control device, such as, for example, a microprocessor, performs user interface and controller functions for the mailing machine. Specifically, the control device provides all user interfaces, executes control of the mailing machine and print operations, calculates postage for debit based upon rate tables, provides the conduit for the Postal Security Device (PSD) to transfer postage indicia to the printer, operates with peripherals for accounting, printing and weighing, and conducts communications with a data center for postage funds refill, software download, rates download, and market-oriented data capture. The control device, in conjunction with an embedded PSD, provides the system meter that satisfies U.S. and international postal regulations regarding closed system information-based indicia postage meters. The United States Postal Service (USPS) initiated the Information-Based Indicia Program (IBIP) to enhance the security of postage metering by supporting new methods of applying postage to mail. The USPS has published draft specifications for the IBIP. The requirements for a closed system are defined in the "Performance Criteria for Information-Based Indicia and Security Architecture for Closed IBI Postage Metering System (PCIBI-C), dated Jan. 12, 1999. A closed system is a system whose basic components are dedicated to the production of information-based indicia and related functions, similar to an existing, traditional postage meter. A closed system, which may be a proprietary device used alone or in conjunction with other closely related, specialized equipment, includes the indicia print mechanism.

The PCIBI-C specification defines the requirements for the indicium to be applied to mail produced by closed systems. The indicium consists of a two-dimensional (2D) barcode and certain human-readable information. Some of the data included in the barcode includes, for example, the PSD manufacturer identification, PSD model identification, PSD serial number, values for the ascending and descending registers of the PSD, postage amount, and date of mailing. In addition, a digital signature is required to be created by the PSD for each mail piece and placed in the digital signature field of the barcode. Several types of digital signature algorithms are supported by the IBIP, including, for example, the Digital Signature Algorithm (DSA), the Rivest Shamir Adleman (RSA) Algorithm, and the Elliptic Curve Digital Signature Algorithm (ECDSA).

Thus, for each mail piece the PSD must generate the indicium once the relevant data needed for the indicium generation are passed into the PSD and compute the digital signature to be included in the indicium. The generation of the indicia and computation of the digital signature requires a predetermined amount of time. For smaller mailing machines that do not have high throughput, the time delay associated with such generation and computation does not limit the throughput, i.e., the calculations are performed quickly enough and therefore are not a limiting factor for the throughput. For larger mailing machines with higher throughputs, however, the speed of processing the mail pieces may be limited by the time required for the PSD to perform its calculations in generating the digital signature and the indicium. Accordingly, the throughput of the mailing machine is confined due to the calculating time required by the PSD.

Thus, there exists a need for a method and system that optimizes the throughput of a mailing machine by reducing the amount of time necessary for the PSD to generate the indicium and calculate the digital signature for each mail piece.

SUMMARY OF THE INVENTION

The present invention alleviates the problems associated with the prior art and provides a method and system that optimizes the throughput of a mailing machine by reducing the overall amount of time necessary for the PSD to generate the indicium and calculate the digital signature for each mail piece.

In accordance with the present invention, the entire debit operation performed by the PSD is separated into three different sections: a pre-debit operation section, a perform debit operation section, and a complete debit operation section. In addition, the calculation of the digital signature can optionally be pre-computed, or alternatively, computed in stages, i.e., partial signature calculation. Utilizing this granularity, the cryptographic operations associated with generating the digital signature can be shifted between the three debit operations such that the execution time of the time critical portion of the debit operation (perform debit) can be optimized to meet the performance requirements of the mailing machine in which the PSD is deployed.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
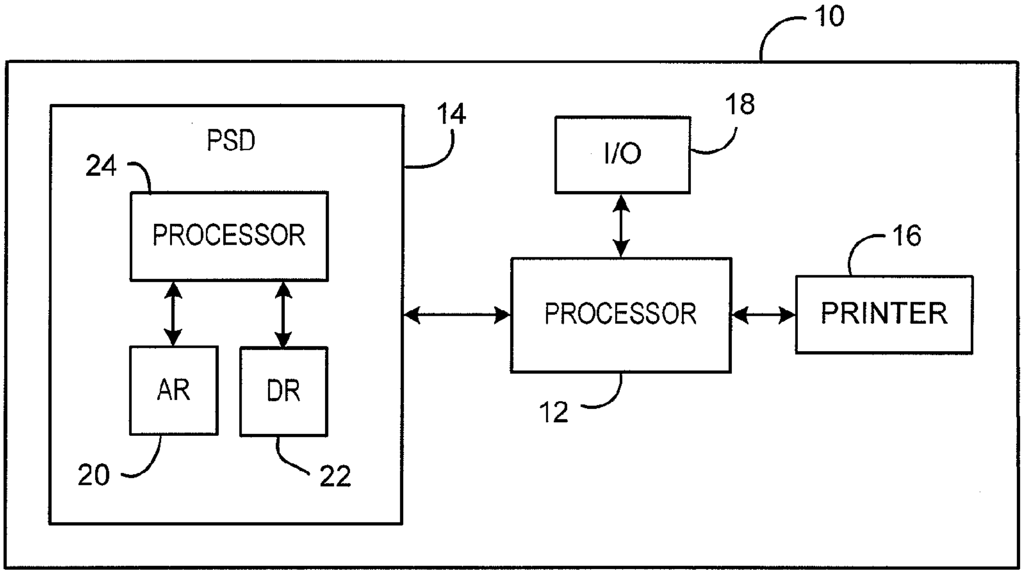
FIG. 1 illustrates in block diagram form a portion of a mailing machine according to the present invention.

In describing the present invention, reference is made to the drawings, wherein there is seen in FIG. 1 a portion of a mailing machine 10 according to the present invention. Mailing machine 10 includes a printer 16 adapted to print postage indicia on a mail piece. Printer 16 is coupled to processor 12, which controls operation of the mailing machine 10. Processor 12 is coupled to one or more input/output devices 18, such as, for example, a keyboard and/or display unit for the input and output of various data and information. Processor 12 is further coupled to a PSD 14 the generates the indicium and calculates a digital signature included in the indicium. PSD 14 includes an ascending register (AR) 20 and a descending register (DR) 22 in which critical accounting data relevant to the operation of the mailing machine 10 is stored. It should be understood that PSD 14 may also include other types of registers as well. PSD 14 further includes a processor 24 that performs cryptographic operations necessary for generating the indicium for each mail piece and calculating the digital signature. The cryptographic operations to be performed by processor 24 could be stored in a memory (not shown) coupled to the processor 24. The indicium, including the digital signature, is passed to the processor 12, which then passes the assembled indicium to printer 16 for printing on a mail piece. Alternatively, processor 12 could perform some of the operations related to generation of the indicium that do not require secure cryptographic processing.

In accordance with the present invention, the operations performed by the PSD 14 in generating an indicium are separated into three different sections: a pre-debit operation section, a perform debit operation section, and a complete debit operation section. In the pre-debit section, the postage value, mailing date, and other data needed to produce the indicium are input into the PSD 14. In the perform debit section, the registers 20, 22 of PSD 14 are updated based on the postage amount. Performance of this section is the most time critical, as once the registers 20, 22 have been updated, i.e., accounting for the postage has been completed, they can not be re-credited with the amount of postage if the indicium is not printed. Accordingly, if the perform debit operation has occurred and the indicium is not printed on a mail piece, the user risks losing the postage value. Thus, the perform debit operation is preferably not performed until the mail piece on which the indicium is to be printed has passed a "point of no return," thereby providing some assurance that printing of the indicium will occur. In the complete debit operation, the data from registers 20, 22 is logged to redundant registers (not shown) in PSD 14, along with other maintenance functions necessary for the PSD 14. Further according to the present invention, the calculation of the digital signature may be completely pre-computed or alternatively, computed in stages, i.e., partial signature calculation. Utilizing this granularity, the cryptographic operations associated with generating the digital signature can be shifted between the three debit operations such that the execution time of the time critical portion of the debit operation (perform debit) can be optimized to meet the performance requirements of the mailing machine 10 in which the PSD 14 is deployed as will be further described below.

Figure 2:
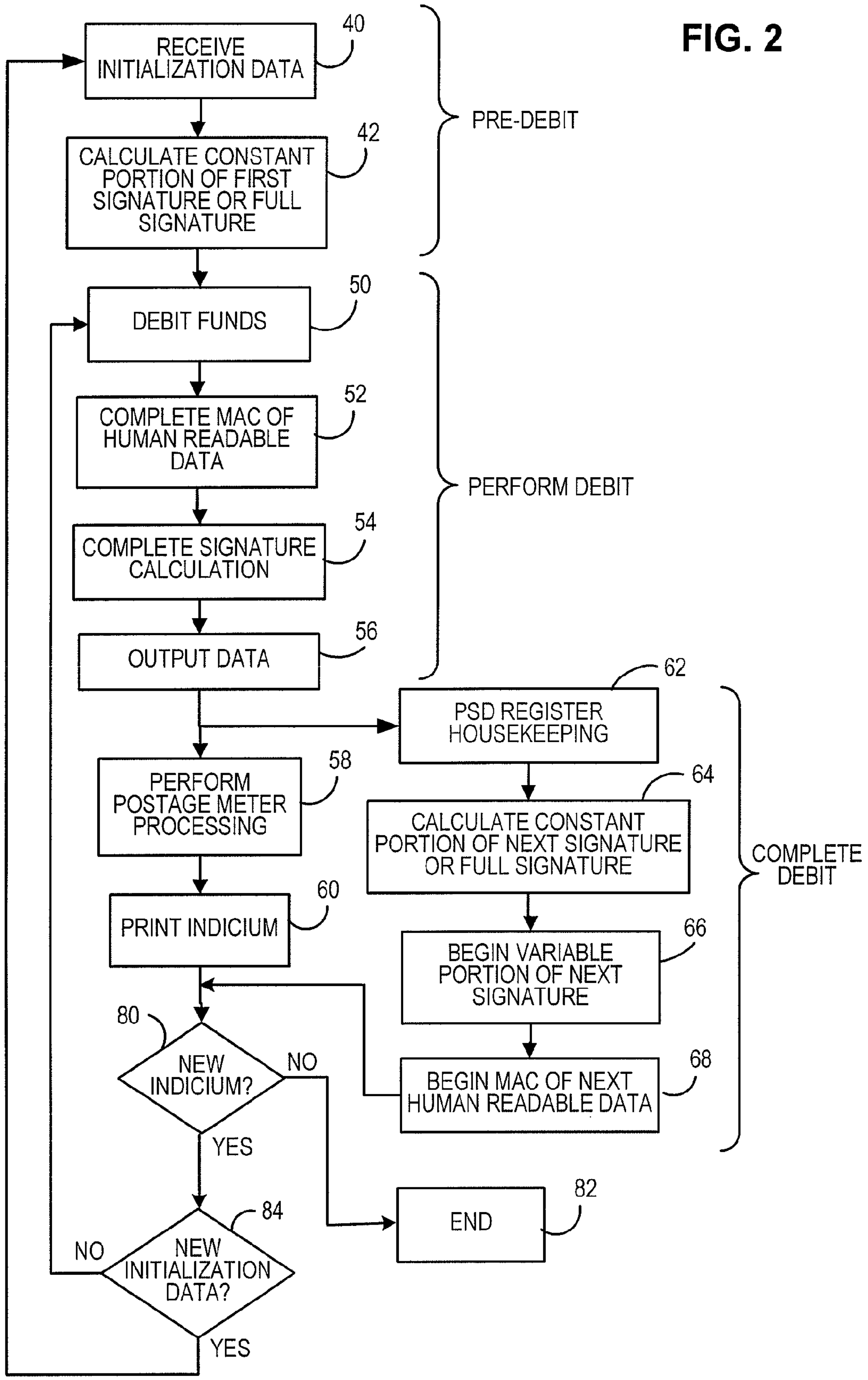
FIG. 2 illustrates in flow chart form the options for processing debit operations according to the present invention.

Referring now to FIG. 2, there is illustrated in flow chart form the processing for a general debit operation according to the present invention. In step 40, initialization data is received by PSD 14. Such initialization data includes, for example, postage value, submission date, and other relevant data necessary for the generation of the indicia and digital signature. In step 42, the constant portion of the first signature is calculated by processor 24 of PSD 14, or alternatively, the complete signature may be pre-computed in step 42. A signature is computed by completing two calculations utilizing various parameters. For example, the DSA algorithm uses the following predetermined parameters known by the PSD 14:

p=a prime number between 512 and 1024 bits in length;

q=a 160 bit prime factor of (p−1);

$g=h^{(p-1)/q} \bmod p$, where h is any number less than p−1 such that $h^{(p-1)/q} \bmod p>1$;

x=a number less than q (this is the private key);

$y=g^x \bmod p$ (this is the public key).

The 40-byte signature, comprising two portions r and s as defined below, is computed using the following additional parameters:

k=a random number less than q (determined by processor 24 of PSD 14);

m=the message to be signed; and

H(m)=the hash of the message to be signed.

The values for r and s of the signature are calculated as follows:

$$r=(g^k \bmod p) \bmod q \tag{1}$$

$$s=(k^{-1}*(H(m)+x*r)) \bmod q \tag{2}$$

Because the only variables in the signature data are the random number k, which is determined by processor 24, the message m and the message hash H(m), the value of r in equation (1) above can be pre-computed in step 42. In addition, in step 42 the values for $k^{-1}$ and $k^{-1}*x*r$ can also be computed, thus reducing the time required for calculation of the value of s in equation (2), or, alternatively, if the message is known, the value for s can be computed in step 42 as well, thereby pre-computing the complete signature.

In step 50 the registers 20, 22 of PSD 14 are adjusted, i.e., funds are debited from register 22 and register 20 is updated to reflect the postage amount. In step 52, a Message Authentication Code (MAC) for the human readable data in the indicium is completed, thereby completing generation of the indicium. If the complete signature has not already been calculated, then in step 54, the complete signature is calculated, i.e., the value of s is calculated using equation (2) above. Alternatively, instead of a MAC, the entire indicium data block, including the barcode data, the completed signature of the barcode data and the human readable data, can be over-signed with a second signature. In step 56, the generated data, including the indicium and signature (and over-signature if used), is output to processor 12 of mailing machine 10.

In step 58, the processor 12 of mailing machine 10 performs postage meter processing, including, for example, formatting the data received from PSD 14 for printing, generating a bit map of the indicium (if necessary), and calculating an error correction code for the formatted data. In step 60, the indicium, including the digital signature, is printed on a mail piece by printer 16 of mailing machine 10. The processing then continues to step 80 to determine if a new indicium is to be generated for a next mail piece.

According to the present invention, while the postage meter processing in step 58 and printing of the indicium in step 60 are being performed, PSD 14 can optionally be performing functions for the next indicium to be generated. For example, in step 62, processor 24 of PSD 14 can perform register housekeeping, i.e., data from registers 20, 22 is logged to redundant registers (not shown) in PSD 14, along with other maintenance functions necessary for the PSD 14. In step 64, the constant portion of the next signature, i.e., the value for r, can be calculated using equation (1) above, or alternatively, the next complete signature can be pre-computed similarly as described with respect to step 42. If the next complete signature is not pre-computed in step 64, then in step 66 at least a portion of the variable portion of the next signature, i.e., the values for $k^{-1}$ and $k^{-1}*x*r$, can be computed, thus reducing the time required for complete calculation of the value of s in equation (2) when that computation is performed. In step 68, the MAC of the human readable data (or over-signature) for the next indicium is begun. The processing then continues to step 80 to determine if a new indicium is to be generated for a next mail piece.

In step 80, it is determined if a new indicium is being generated. If no new indicium is being generated, then in step 82 the session ends. If in step 80 it is determined that a new indicium is being generated, then in step 84 it is determined if new initialization data is being entered, such as, for example, the weight of the next mail piece is different than the previous mail piece thereby altering the message m and correspondingly the hash of the message H(m), as well as the human readable data. If no new initialization data is being entered, then the processing returns to step 50 to begin the perform debit section utilizing the signature (or portions thereof) calculated in steps 64-68. If in step 84 it is determined that new initialization data is being entered, then the processing returns to step 40 and the calculations previously performed in steps 64-68 may have to be recalculated in any one of steps 42, 52 and 54 (or any combination thereof) for the next indicium. In addition, it should be understood that calculation of the next signature could begin in the complete debit section of the previous indicium and be completed in the pre-debit section of the current indicium. Thus, the pre-debit section is necessary only if information provided to the PSD 14 has changed, such as, for example, the weight of the mail piece and accordingly the postage value, the submission date, or other necessary indicia data.

Figure 3:
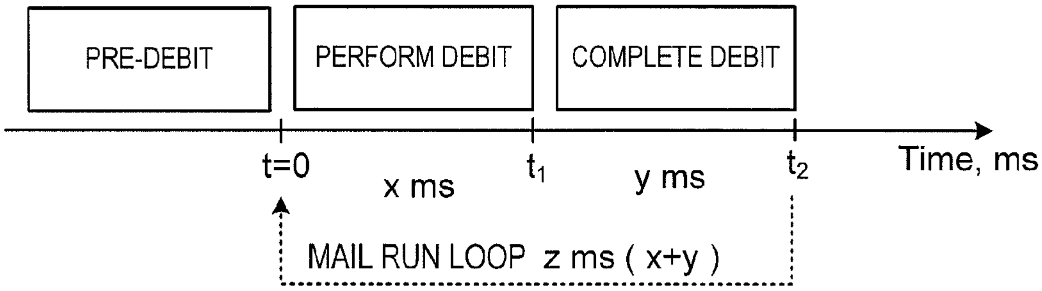
FIG. 3 illustrates a timing diagram for the processing of debit operations according to the present invention.

As illustrated in FIG. 2, the entire debit operation is separated into three different sections: the pre-debit operation including steps 40-42, the perform debit operation including steps 50-56, and the complete debit operation including steps 58-60, and optionally in parallel steps 62-68. The timing diagram illustrated in FIG. 3 represents the debit scenario in a PSD 14 with timing requirements for a mail piece cycle of z milliseconds (ms). As illustrated, the timing cycle does not begin until the perform debit operation begins at t=0. The operations performed within the perform debit section (steps 50-56 of FIG. 2) must be completed within a window of time $t_1$ (illustrated in FIG. 3 as x ms) to allow the other components of mailing machine, such as, for example, processor 12 and printer 16, to complete their necessary functions within the allotted time $t_2$ (illustrated in FIG. 3 as y ms). As noted above, since the total mail piece cycle must not be more than z ms, the sum of x and y must not be greater than z. In accordance with the present invention, the time required for the calculation of the complete signature and MAC (or over-signature) can be significantly reduced by pre-calculating at least a portion of the signature and/or MAC (or over-signature) in the pre-debit section or in parallel with the complete debit section. Accordingly, the total time required for the most time critical part of the entire debit process, i.e., the perform debit operation (x ms in FIG. 3), can be reduced, thereby reducing the total mail piece cycle time (z ms). By reducing the total mail piece cycle time, the throughput of mailing machine 10 in which PSD 14 is installed can be increased.

Figure 4:
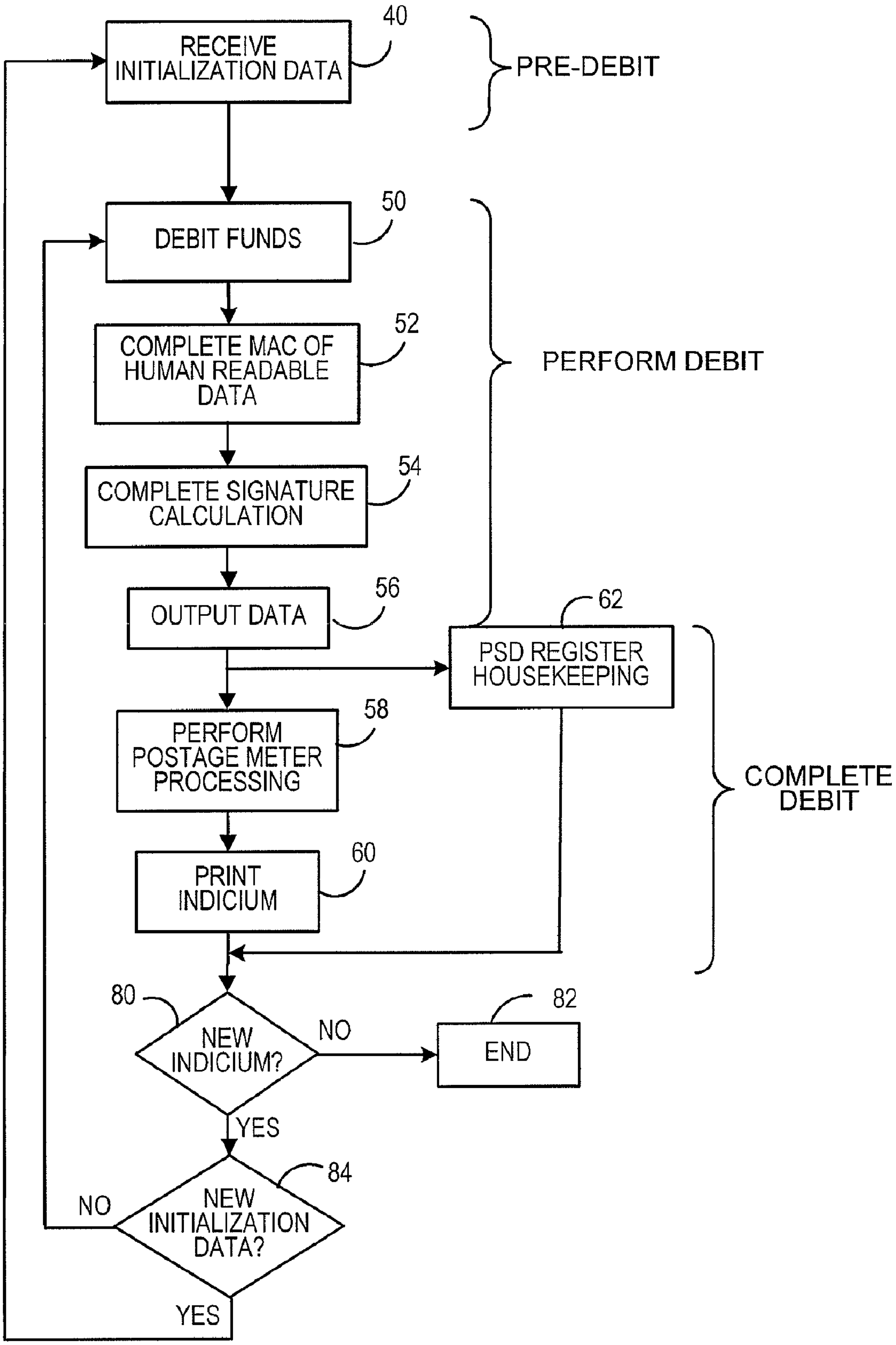
FIG. 4 illustrates in flow chart form an example for the processing of debit operations according to the present invention.

It should be understood that the debit section in which the processing for the cryptographic operations associated with calculating the digital signature is performed can be based on the desired throughput of the mailing machine 10 in which the PSD 14 is installed. Thus, not every step illustrated in FIG. 2 may be present for a given application. For example, FIG. 4 illustrates in flow chart form the processing performed by PSD 14 in a mailing machine 10 having a low throughput, thereby providing sufficient time for PSD 14 to generate the indicia and signature within the perform debit section. FIG. 4 is similar to FIG. 2, except for the following. Since the mail piece cycle for the implementation illustrated in FIG. 4 is of sufficient time to allow PSD 14 to generate the indicia and signature within the perform debit section, it will not be necessary to pre-compute or partially calculate the signature (steps 42, 64 and 66 of FIG. 2) or to partially calculate the MAC (or over-signature) (step 68 of FIG. 2). Thus, these steps are not necessary and the MAC for the human readable data (or over-signature) can be calculated completely in step 52, and the complete signature calculated in step 54, both within the allowed time frame of the perform debit section for this mail piece cycle.

Figure 5:
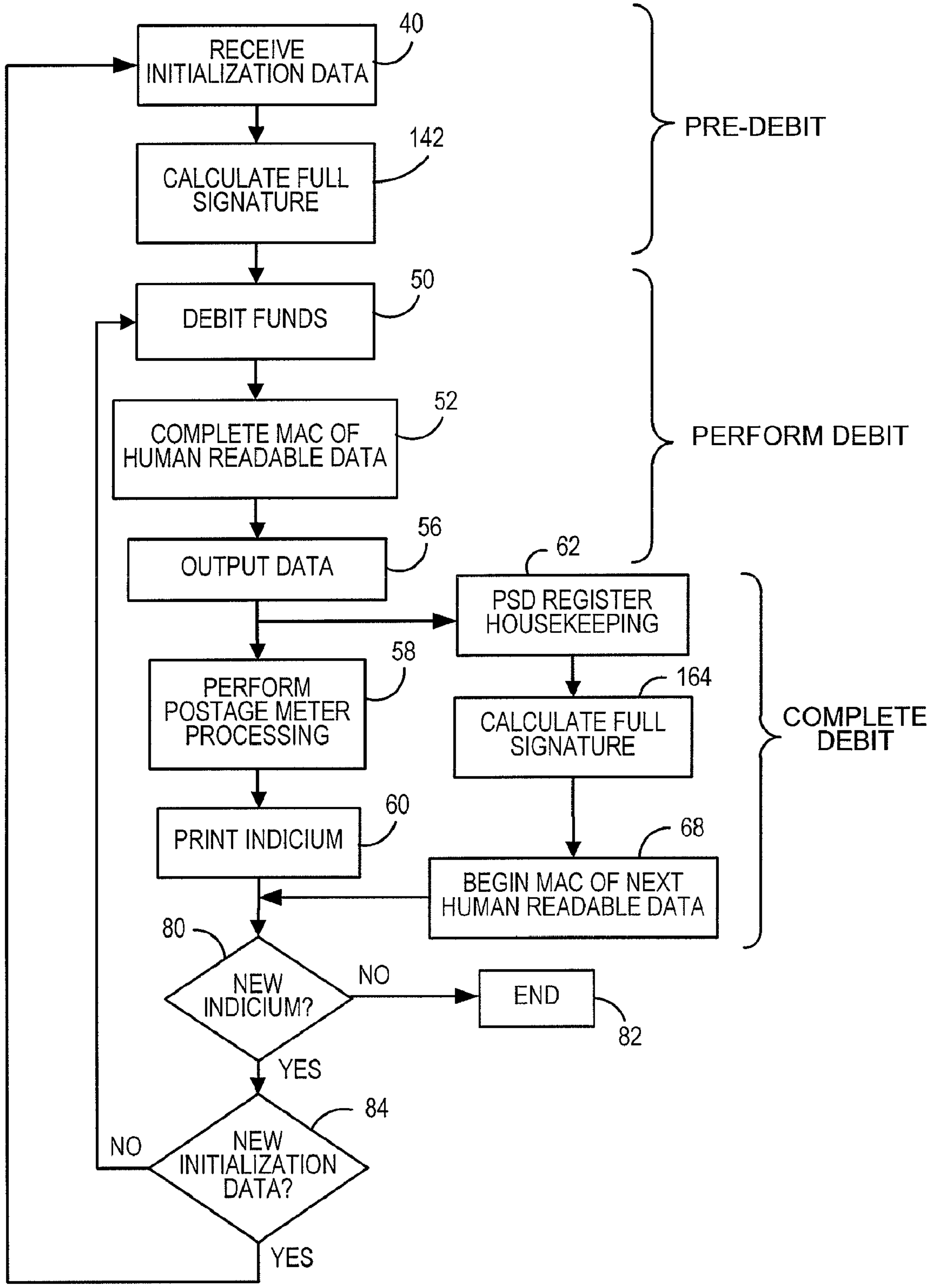
FIG. 5 illustrates in flow chart form another example for the processing of debit operations according to the present invention.

For mailing machines requiring higher throughputs, there may not be sufficient time between each mail piece for PSD 14 to perform the debit and signature functions within the perform debit section. Accordingly, in the present invention, calculation of the complete signature can be moved outside of the perform debit section and performed either in the pre-debit section (step 42) or in parallel with the complete debit section (step 64). An example of this situation is illustrated in FIG. 5, which is similar to FIG. 2 except for the following. In steps 142 and 164, the full signature is pre-computed. Thus, it will not be necessary to complete the signature calculation (step 54 of FIG. 2) or to begin the variable part of the next signature (step 66 of FIG. 2). By pre-computing the complete signature, either in the pre-debit section or in the complete debit section in parallel with printing, the time required for the perform debit section can be reduced. By reducing the time required for the perform debit section, the mail piece cycle time can be reduced, thereby increasing the throughput of the mailing machine 10 in which the PSD 14 is installed.

Figure 6:
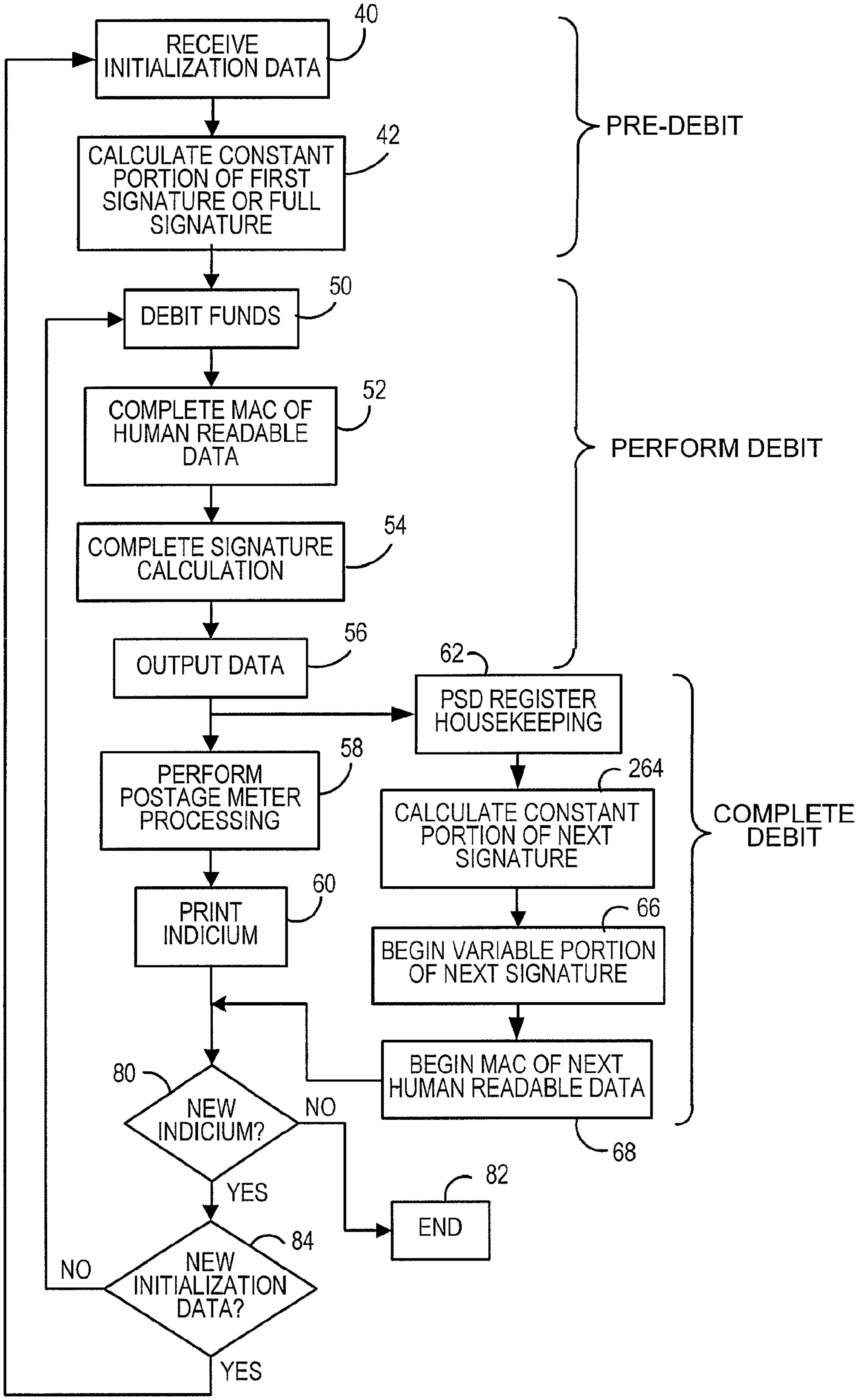
FIG. 6 illustrates in flow chart form another example for the processing of debit operations according to the present invention.

In some mailing machines, the time required for printing the indicia (step 60 of FIG. 2) may be insufficient to allow pre-computing of the complete signature in parallel with the printing operation. Accordingly, in the present invention, portions of the complete signature can be calculated in parallel with the printing operation. An example of this situation is illustrated in FIG. 6, which is similar to FIG. 2 except for the following. In step 264, only the constant portion of the next signature is calculated, and the complete signature calculation occurs in step 54 (or alternatively in step 42). In addition, after the first indicium has been printed, and a yes response is received in step 80 and step 84, it will not be necessary to repeat the calculation of the constant portion in step 42, after the initialization data is received in step 40, as this will have already occurred previously in step 64. By pre-computing a portion of the complete signature, either in the pre-debit section or in the complete debit section in parallel with printing, the time required for the perform debit section can be reduced. By reducing the time required for the perform debit section, the mail piece cycle time can be reduced, thereby increasing the throughput of the mailing machine 10 in which the PSD 14 is installed.

Thus, according to the present invention, the entire debit operation performed by the PSD is separated into three different sections: a pre-debit operation, a perform debit operation, and a complete debit operation. In addition, the calculation of the digital signature can optionally be pre-computed or, alternatively, computed in stages, i.e., partial signature calculation. Utilizing this granularity, the cryptographic operations associated with generating the digital signature can be shifted between the three debit operations such that the execution time of the time critical portion of the debit operation (perform debit) can be optimized to meet the performance requirements of the mailing machine in which the PSD is deployed.

It should be understood that while the present invention has been described with respect to use of the DSA algorithm for calculating signatures, the invention is not so limited and can be used with any type of algorithm utilized for cryptographic operations.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description.

What is claimed is:

1. A method for providing a series of indicia, each of the series of indicia including a digital signature, the method comprising:

receiving, by the processing device, initialization data for a first indicium of the series of indicia;

calculating, by the processing device, a portion of the digital signature for the first indicium;

performing, by the processing device, a debiting operation for funds associated with a postage value of the first indicium;

completing, by the processing device, the digital signature for the first indicium using data generated in the debiting operation;

before initialization data for a second indicium of the series of indicia is received, calculating, by the processing device, a portion of the digital signature for a second indicium of the series of indicia;

receiving, by the processing device, the initialization data for a second indicium of the series of indicia;

performing, by the processing device, a debiting operation for funds associated with a postage value of the second indicium provided in the initialization data for the second indicium;

completing, by the processing device, the digital signature for the second indicium using data generated in the debiting operation; and before initialization data for a third indicium of the series of indicia is received, calculating, by the processing device, a portion of the digital signature for a third indicium of the series of indicia.

2. The method according to claim 1, wherein calculating a portion of the digital signature for the first indicium further comprises:

calculating a constant portion of the digital signature for the first indicium.

3. The method according to claim 2, wherein completing calculation of the digital signature for the first indicium further comprises:

calculating a variable portion of the digital signature for the first indicium; and combining the variable portion and the constant portion to complete calculation of the digital signature for the first indicium.

4. The method according to claim 1, wherein calculating a portion of the digital signature for a second indicium further comprises:

calculating a constant portion of the digital signature for the second indicium.

5. The method according to claim 4, wherein calculating a portion of the digital signature for a second indicium further comprises:

starting calculation of a variable portion of the digital signature for the second indicium.

6. The method according to claim 1, wherein calculating a portion of the digital signature for a second indicium further comprises:

calculating a constant portion of the digital signature for the second indicium;

calculating a variable portion of the digital signature for the second indicium; and combining the variable portion of the digital signature for the second indicium and the constant portion of the digital signature for the second indicium to complete the digital signature for the second indicium.

7. A security device for providing indicia, the security device comprising:

a processor to generate the indicia, each of the indicia including a digital signature, the processor generating a first indicium based on initialization data received for the first indicium, calculating, a portion of the digital signature for the first indicium, performing, a debiting operation for funds associated with a postage value of the first indicium, completing calculation of the digital signature for the first indicium using data generated in the debiting operation, providing the first indicium, including the digital signature for the first indicium, to a controller for printing, before the printing of the first indicium is completed, calculating a portion of the digital signature for a second indicium, determining if new initialization data for the second indicium is required, if new initialization data for the second indicium is not required, performing a debiting operation for funds associated with a postage value of the second indicium, completing the digital signature for the second indicium using data generated in the debiting operation, providing the second indicium, including the digital signature for the second indicium, to the controller for printing, and, before the printing of the second indicium is completed, calculating a portion of the digital signature for a third indicium.

8. The security device according to claim 7, wherein the processor calculates a portion of the digital signature for the first indicium by calculating a constant portion of the digital signature for the first indicium.

9. The security device according to claim 8, wherein the processor completes the digital signature for the first indicium by calculating a variable portion of the digital signature for the first indicium, and combining the variable portion and the constant portion to complete the digital signature for the first indicium.

10. The security device according to claim 7, wherein the security device further comprises at least one register, and performing a debiting operation includes adjusting a value in the at least one register to reflect the postage value of the first indicium.

11. A mailing machine comprising:

a printer for printing an indicium on a mail piece;

a controller coupled to the printer; and a security device coupled to the controller, the security device including a processor to generate the indicium, the indicium including a digital signature, the processor generating a first indicium based on initialization data received for the first indicium, calculating a portion of the digital signature for the first indicium, performing a debiting operation for funds associated with a postage value of the first indicium, completing the digital signature for the first indicium using data generated in the debiting operation, providing the first indicium, including the digital signature for the first indicium, to the controller for printing by the printer, and, before the printing of the first indicium is completed, calculating a portion of the digital signature for a second indicium, determining if new initialization data for the second indicium is required, if new initialization data for the second indicium is not required, performing a debiting operation for funds associated with a postage value of the second indicium, completing the digital signature for the second indicium using data generated in the debiting operation, providing the second indicium, including the digital signature for the second indicium, to the controller for printing, and, before the printing of the second indicium is completed, calculating a portion of the digital signature for a third indicium.

12. The mailing machine according to claim 11, wherein the processor calculates a portion of the digital signature for the first indicium by calculating a constant portion of the digital signature for the first indicium.

13. The mailing machine according to claim 12, wherein the processor completes the digital signature for the first indicium by calculating a variable portion of the digital signature for the first indicium, and combining the variable portion and the constant portion to complete the digital signature for the first indicium.

14. The mailing machine according to claim 11, wherein the security device further comprises at least one register, and performing a debiting operation includes adjusting a value in the at least one register to reflect the postage value of the first indicium.

15. The mailing machine according to claim 11, wherein the processor calculates a portion of the digital signature for a second indicium by calculating a constant portion of the digital signature for the second indicium.

16. The mailing machine according to claim 15, wherein the processor calculates a portion of the digital signature for a second indicium by starting calculation of a variable portion of the digital signature for the second indicium.

17. The mailing machine according to claim 11, wherein the processor calculates a portion of the digital signature for a second indicium by calculating a constant portion of the digital signature for the second indicium, calculating a variable portion of the digital signature for the second indicium, and combining the variable portion of the digital signature for the second indicium and the constant portion of the digital signature for the second indicium to complete the digital signature for the second indicium.

* * * * *